March 28, 1967 M. BACHMANN 3,311,243
CRANE CABLE WAY FOR SLOPES WITH A SINGLE PULLING
AND HOISTING CABLE PASSING THROUGH THE TROLLEY
Filed Aug. 16, 1965 6 Sheets-Sheet 1

INVENTOR
MARCEL BACHMANN
By Shoemaker and Mattare
ATTYS.

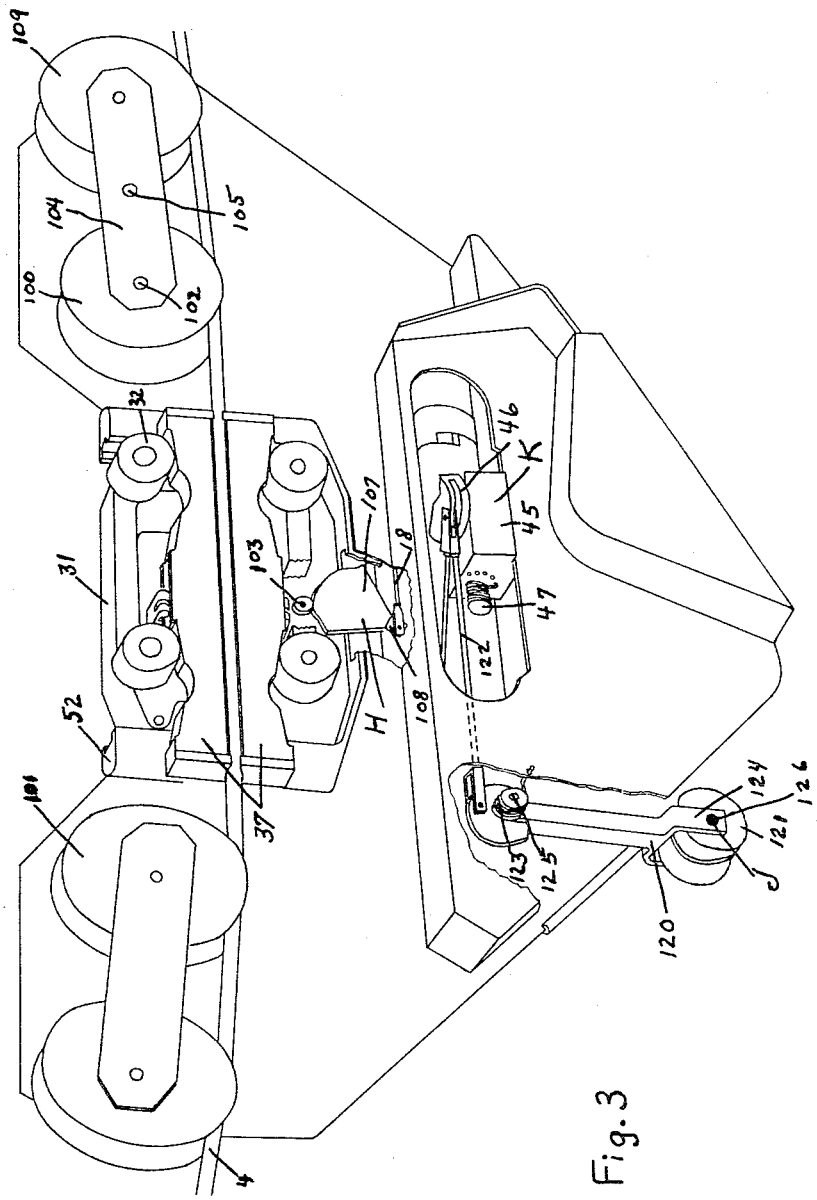

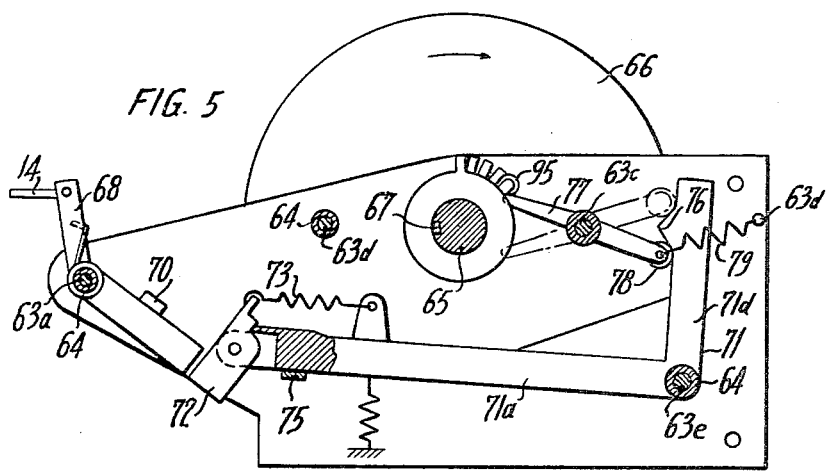
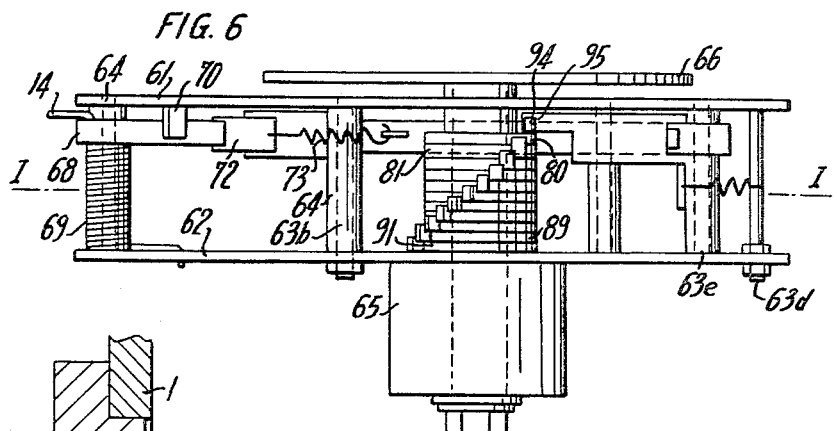
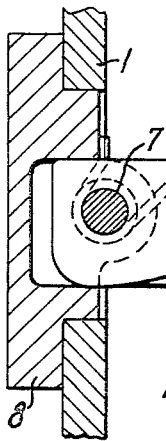
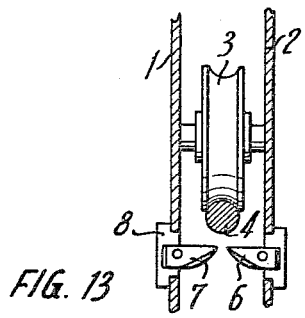

March 28, 1967 M. BACHMANN 3,311,243
CRANE CABLE WAY FOR SLOPES WITH A SINGLE PULLING
AND HOISTING CABLE PASSING THROUGH THE TROLLEY
Filed Aug. 16, 1965

INVENTOR
MARCEL BACHMANN
By Shoemaker and Mattare
Attys.

United States Patent Office 3,311,243
Patented Mar. 28, 1967

3,311,243
CRANE CABLE WAY FOR SLOPES WITH A SINGLE PULLING AND HOISTING CABLE PASSING THROUGH THE TROLLEY
Marcel Bachmann, c/o Bachmann & Co. A.G., Steffisburg, Bern, Switzerland
Filed Aug. 16, 1965, Ser. No. 479,833
Claims priority, application Switzerland, Mar. 16, 1965, 3,738/65
12 Claims. (Cl. 212—87)

The subject matter of the present invention is a crane cable way for slopes comprising a single pulling and hoisting cable passing through the trolley, a holding and lowering means for the load hook, mounted for pivoting on the trolley, and a clamping means to secure the trolley at any desired point along the supporting cable, the preliminary clamping effect being initiated by an adjustable control device mounted on the trolley and the main clamping effect being produced by the weight active at the trolley, the clamping means being moved away from the cable during travel.

In accordance with the invention the trolley is equipped with a mechanical sequence switching means operatively connected to the control device, the holding and lowering means for the load hook and those parts of the clamping means which carry out the preliminary stage of the clamping operation.

The purpose of the sequence switching means according to the invention is to guarantee the correct sequence for the functions required to stop the trolley, advance the clamping means to the cable and clamp them, lower and raise the load hook, release and move away the clamping means and move on the trolley. Further advantages of the invention will become apparent from the rest of the description.

Figure 1:
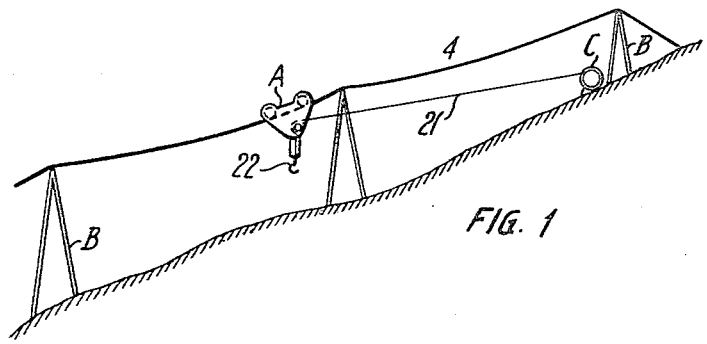
Figure 9:
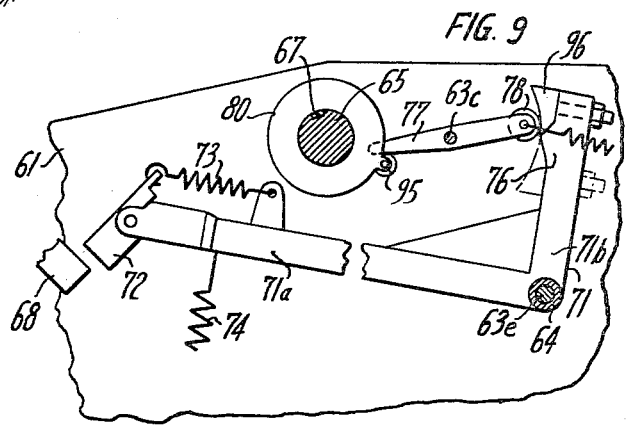
Figure 10:
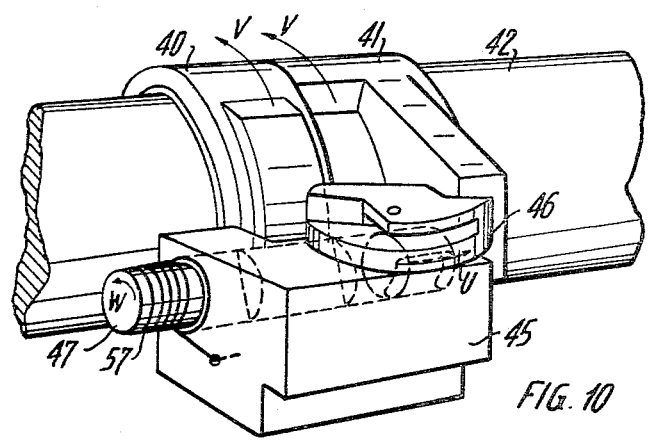
Figure 2:
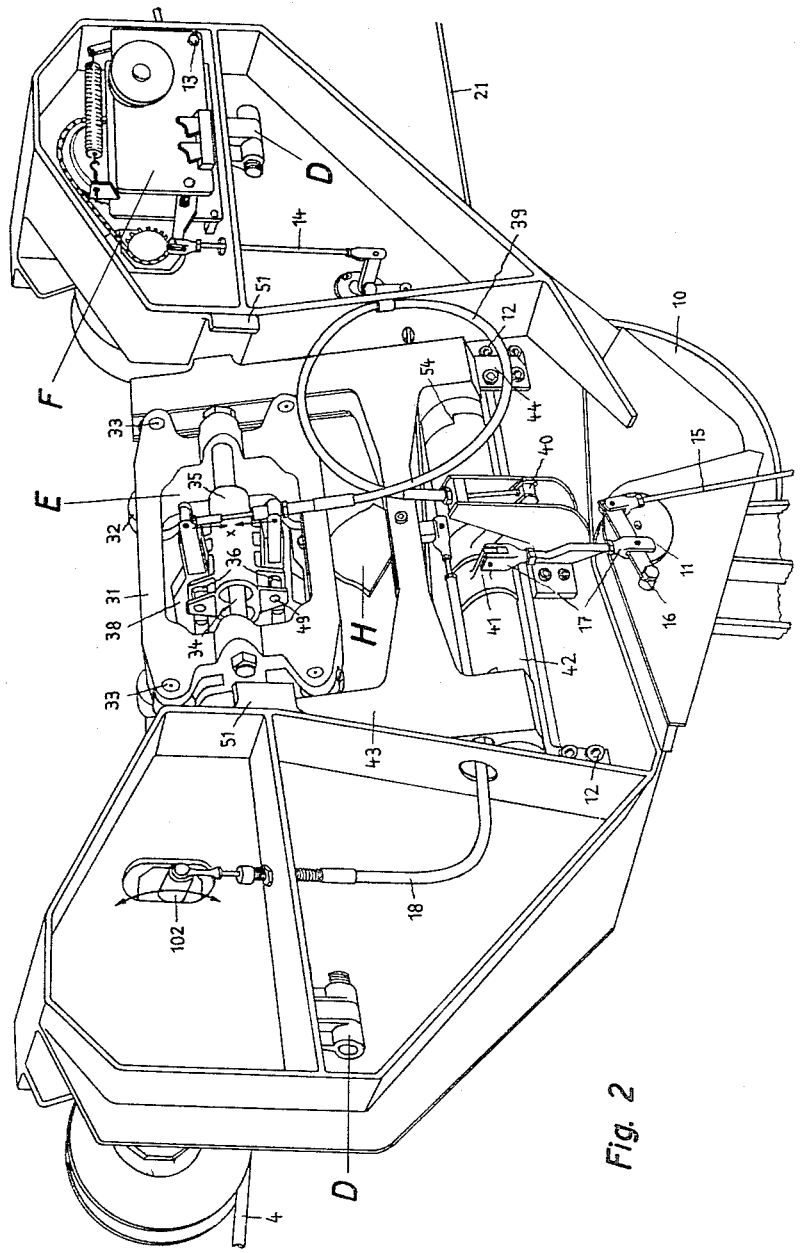
Figure 2A:
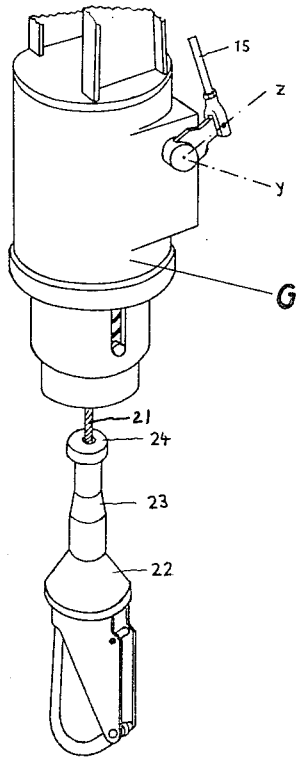
Figure 11:
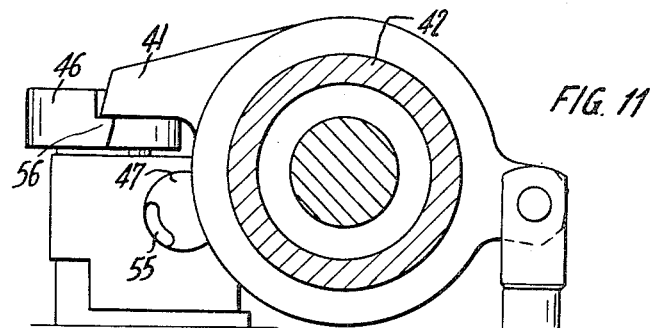
Figure 12:
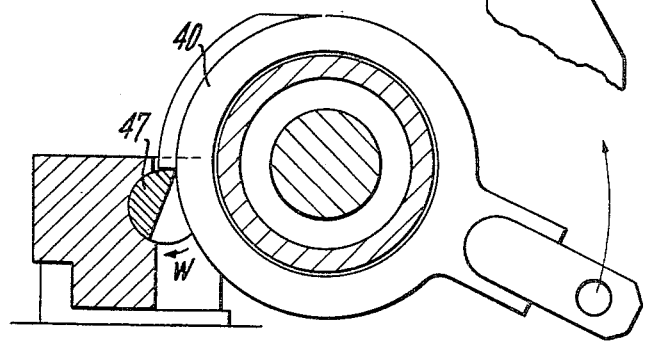
Figure 4:
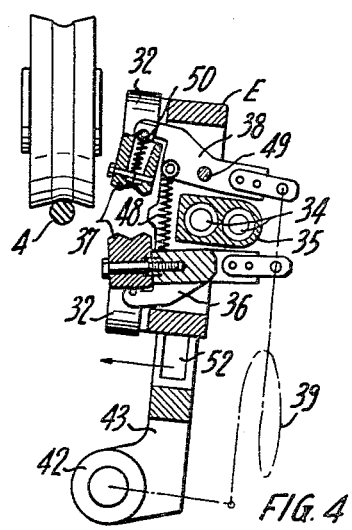
Figure 7:
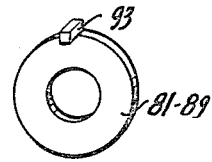
Figure 8:
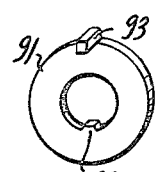

An example of the invention is illustrated in the accompanying drawings, in which:

FIG. 1 is a view of the crane cable way,
FIG. 2 shows the trolley in perspective,
FIG. 2a shows the holding and lowering means,
FIG. 3 shows parts of the trolley including the safety device in the case of the pulling cable breaking and the level control for the clamping means,
FIG. 4 is a part sectional view of the clamping means for securing the trolley to the cable.
FIG. 5 is a section taken through the control device along the line I—I of FIG. 6,
FIG. 6 is a plan view of the control device,
FIGS. 7 to 9 show details of the control device,
FIG. 10 is a perspective view of the sequence initiating device,
FIGS. 11 and 12 show details of the sequence initiating device, and
FIGS. 13 and 14 show details of the safety device to prevent a trolley from being accidentally lifted off the cable.

The crane cable way for slopes (FIG. 1) comprises a trolley A adapted to travel along a cable 4 supported on uprights B. For this purpose it is provided on the uphill side with a cable winch C by which the single cable 21 used both for hoisting and transporting is passed through the trolley. The load hook member 22 is fixed to the free end of the cable 21.

The trolley A comprises the following parts:
A clamping device E equipped with means to produce a preliminary and a main clamping action and serving to secure the trolley A to the supporting cable 4; the control device F, driven by means of a roller of the trolley, for automatically initiating the preliminary clamping stage in the clamping device E; holding and lowering means G for the load hook; a sequence initiating device A to guarantee the correct sequence of the functions necessary for clamping and terminating the clamping action; a level control H to adjust the clamping means E in the vertical direction; means D to prevent the trolley from being accidentally lifted off the supporting cable; a safety device J for securing the trolley to the supporting cable should the pulling cable break. The means E, F, G and J each form structurally enclosed units.

The holding and lowering means G is fixed to the trolley A merely by two removable bearing pins 11 in such a way that it can pivot in the direction of travel and can be interchanged. The clamping means E is mounted on the trolley A by the screws 12 so that it can swing out therefrom and so that it can be interchanged. The control device F is mounted interchangeably on the side wall of the trolley A by screws 13. The sequence initiating device K is mounted on the main support A. A connecting mechanism 14 serves to transmit the functional movements between the control device F and the sequence initiating device K. For the same purpose the device K is connected to the clamping means E by a flexible tension and compression element 39 and coupled with the means G by a connecting rod 15 provided with a joint 17 supported on a swivel arm 16. A flexible tension and compression element 18 serves to actuate the level control means H through the running gear.

The pulling cable 21 used both for hoisting and pulling purposes is passed through the trolley A by means of a guide pulley 10. The load hook member 22 is attached to its free end.

The construction and mode of operation of one embodiment of the means E, F, G, H, D and J will now be described.

Clamping means for fixing the trolley to the supporting cable

The clamping means E (FIGS. 2, 3 and 4) comprises a central main yoke 31 slidably mounted in grooves 52 in a rocker arm 43 by two pairs of guide rollers 33. Fixed to the main yoke are two pairs of clamping rollers 32, one at the top and one at the bottom cross yoke, and the thrust bearing shafts 34. Mounted on these shafts for axial displacement is the thrust bearing 35 on which the clamping jaws 27 are overhung-mounted by means of two jaw holders 36. Two clamping levers 38 are arranged in an independent mount on the thrust bearing 35 and, controlled by a flexible tension element 39, produce the preliminary clamping effect. The tension element 39 is connected at the other end to the freely mounted clamping pawl 40 which is in turn operatively connected to the switching pawl 41. The switching sleeve 42 and switching pawl 41 form a rigid unit.

The rocker arm 43 is mounted on a longitudinal shaft in the end bearing 44, thereby enabling the clamping means 31 to 38 to rotate about an axis parallel to the supporting cables 4; it can thus be moved towards the cable to initiate the clamping process and moved away from the cable when the clamping action has been terminated. The pivotal movement is actuated by means provided in the switching sleeve 42.

The clamping means is controlled by the sequence initiating device K, comprising the housing 45, the holding lock or bolt 46 and the rotary lock or bolt 47, as described further on in the specification.

The control means for automatically releasing the preliminary clamp in the clamping means E The construction and mode of operation of the control device are already known and do not form part of the invention. However, the operations carried out by the control device are essential to an understanding of the operation of the clamping means E and will now be described by reference to an example. In its mode of operation this is the same as the control device F shown in FIG. 2 although in its structural details it is slightly different.

The control device F (FIGS. 5 and 6) comprises a housing with two parallel side walls 61 and 62 joined together by bolts 63a and 63e with a spacing sleeve 64 placed thereon. A drive shaft 65 is rotatably mounted in these side walls; fixed to it is a driving wheel 66 made to rotate by a roller of the trolley. The shaft 65 contains a lengthwise groove 67 on the outside.

A two-armed switching lever 68 is pivotally mounted on the bolt 63a; in its normal position, as shown in FIG. 5, it is pressed by the action of a torsion spring 69 against a stop 70 on the side wall 61. The connecting rod 14 to the sequence switching means K is attached to the upwardly extending arm of the lever. An angle lever 71 is pivotally mounted on the bolt 63 and the free end of its arms 71a carries a pawl 72 capable of limited pivoting movement. In the starting position shown in FIG. 5 a projection from the rear of the pawl 72 leans against the arm 71a in such a way that the pawl can only be moved anti-clockwise out of this position. The pawl 72 is held in the starting position by a tension spring 73. The angle lever 71 is held in the normal position shown in FIG. 5 by a tension spring 74, the lower end of which is fixed adjustably to an angled portion of the side wall 61 and the other end of which is fixed to a projection from the arm 71a. In this position the arm 71a of the lever 71 is in contact with a stop 75 attached to the side wall 61. The upper arm 71b of the lever 71 has protrusion 76 on the inside. Finally, an intermediate two-armed lever 77 carrying a roller 78 at one end is mounted on the pin 63c so as to pivot about the latter. The end not carrying the roller is flat and wedge-shaped. An additional tension spring 79 connects the lever 77 with the bolt 63d.

The plurality of circular discs 80 to 89 and 91 containing central holes are pushed onto the drive shaft 65 so that their sides are in contact with one another. The discs 80 to 89 are mounted loosely rotatably on the shaft 65 whereas the disc 91 (FIG. 8) has a spring 92 engaging in the groove 67. All the discs are provided at the periphery with an entrainment member 93. The axial width of these members is such that they each engage over the adjacent disc and thereby come into contact with each other when the discs are rotated.

Between the disc 80 and the side wall 61 is a gap wide enough to leave room for the end of one arm of the intermediate lever 77. The disc 80 has a switching finger 94 which extends into this space and on which a roller 95 is mounted.

The driving wheel 66 rotates, for example in the direction of the arrow, as the trolley moves along the supporting cable; it turns the disc 91 in the same direction, whereby all the entrainment members 93 make the discs next to them turn in the same direction. On rotation of the disc 80 the roller 95 depresses the left hand arm of the lever 77 so that the lever is swivelled anti-clockwise until the roller 95 slides off it again. The lever 77 then remains in the out of action position shown in broken lines in FIG. 5. During this swivelling movement on the part of the lever 77 the roller 78 slides over the protrusion 76 from the angle 71 and makes the latter carry out a short pivoting movement before returning immediately to the starting position.

During this first swivelling movement of the lever 71 the pawl 72 slides along the rear edge of the switching lever 68 while stretching the spring 73; the action of the spring 73 brings its lower surface onto the rear upper surface of the right hand arm of the lever 68 next to the stop 70. During the return movement of the lever 71 the pawl 72 turns the switching lever 68 clockwise and simultaneously draws in the mechanism 14 until its slides off the back of the switching lever again and moves into the inoperative position. A single control movement has taken place (swinging of the lever 68 to and fro and pulling on the connecting rod 14); if the drive shaft 65 continues turning in the same direction, i.e. if the trolley advances in the same direction, the roller 95 mounted on the switching finger 94 will merely move along the intermediate lever 77 without producing any action.

If further switching is desired it will be necessary to change the rotary direction of the driving wheel 66 and thus of the shaft 65. This is done by changing the direction in which the trolley travels. The driving wheel 66 then rotates in the opposite direction to the arrow. The disc 91 rotates with the shaft, its entrainment member 93 frees itself from the member 93 for the adjacent disc and after approximately one revolution comes back from the other side into contact with the entrainment member for the disc 89. The disc 89 is entrained in the new rotary direction and the process of lifting and reapplying the entrainment members from the other side is repeated in succession for all the discs. After approximately 9½ revolutions of the shaft 65 the disc 80 is entrained and the switching finger 94 and roller 95 grip the intermediate lever 77 from below and thereby swing it into the position shown in full lines in FIG. 5. The second control movement takes place in the same direction as already described. For further switching operation the rotary direction of the shaft 65, i.e. the direction of movement of the trolley, has to be changed each time.

The purpose of interposing the discs 81 to 89, which can be interchanged or removed as desired, is to enable the switching time to be adjusted at will according to the number of revolutions of the shaft 65 within the space available for a maximum number of discs.

According to the use to which the crane cable way is being put it may be desirable for no switching to take place, for example in one rotary direction of the wheel 66, in spite of the swivelling of the intermediate lever 77. For this purpose the apparatus is equipped with a locking block 96 shown in full lines in FIG. 9; this can be inserted in a hole in the arm 71b of the angle lever by means of a set screw and thus placed in one of the supporting surfaces, provided on this arm, for the roller 78. Once the block 96 is thus attached to the arm 71b, if the roller 78 should come to rest on the block 96 after the swivelling of the lever 77 then the angle lever 71, which has swivelled clockwise when travelling over the protrusion 76, cannot swing back so that a control movement is omitted.

*Holding and lowering means for the load hook*

The holding and lowering means G for the load hook comprises a housing which is completely closed except for the load hook aperture and which contains the clamping tongs and mechanical means operable by cable pulling for opening and closing the tongs. This load pendulum is described at length in Swiss Patent No. 341,289.

The load pendulum G is coupled to the sequence initiating means K by the connecting rod 15 which transmits the functions of the mechanical means in the load pendulum G produced by pulling or releasing the pulling and hoisting cable to the sequence initiating device K.

*Sequence initiating device*

The sequence initiating device K (FIG. 10) comprises the switching pawl 41, the clamping pawl 40, the holding bolt 46, and the rotary bolt 47; the last two are arranged in the housing 45.

The switching pawl 41 is fixed, for example keyed, to the switching sleeve 42. It is operatively connected by the joint 17 and swivel arm 16 to the rod 15 which is in turn controlled by the holding and lowering means G. The pawl 41 acts by means of a cam connection on the clamping pawl 40 rotatably mounted on the sleeve 42. The flexible tension element 39 is mounted on the pawl 40 and can actuate the two clamping levers 38 of the preliminary clamping device.

The holding lock 46 is rotatably mounted in the housing 45 and has an upper portion in the form of a round plate with excisions. These are shaped so that in one position of the lock 46 the switching pawl 41 can rotate (in the opposite direction from that in FIG. 10), while after the lock has been moved in the rotary direction $u$ the pawl 41 is locked in its upper position. The same functions, i.e. locking in the upper position and release, are exerted by the rotary lock 47 in respect of a clamping pawl 40. The latter is rotatably mounted in the housing 45 axially parallel to the switching sleeve 42.

Level control

The level control H (FIG. 3) is provided for travelling gear having more than two rollers. Its purpose is to hold the supporting cable 4 in the same position in respect of the two clamping jaws 37 of the clamping means 31 to 38 independently of the load on the hook and thereby to ensure that the trolley is safely clamped and secured. In the case of travelling gear with two rollers the supporting cable forms a line remaining virtually constant even if the position of the trolley between the two rollers varies; but in the case of travelling gear having more than two rollers the cable line is determined by the two innermost rollers (100, 101 in FIG. 3) and can be displaced vertically upwards or downwards according to the load and the number of rollers.

The main part of the level control H is a curved plate 107 articulated by a cam 108 to a flexible tension and compression element 18. The element 18 is connected at the other end to the shaft 102 of the innermost roller 100. The two rollers 100 and 109 are mounted in the rocker 104 rotatable about the shaft 105. The clamping system 31 to 38, which is mounted for vertical displacement in the rocker arm 43 by means of four rollers 33, presses continuously with its own weight onto the curved plate 107 by means of the roller 103.

When there is any change in the load on the trolley the rocker 104 rotates about its shaft 105; the pressure of the inner rollers causes the part of the cable 4 extending between the clamping jaws to be moved vertically, and the tension and compression element 18 makes the curved plate 107 rotate. The latter is shaped so that the roller 103 in contact with it is displaced vertically the same distance as the length of cable located between the inner rollers; as the roller 103 is fixed to the clamping means 31 to 38 the latter also moves the same distance in the same direction so that the cable is again exactly in the central plane of the two jaws 37.

Mode of operation

The co-operation between the clamping means E, the control device F, the holding and lowering means G and the level control H will now be described referring to an example in which the load is picked up between the central cable support B and the winch C, then the trolley moves into the valley and the load is lowered.

The winch C draws in the cable 21 and moves the trolley beyond the load receiving station in accordance with the switching distance predetermined in the control device F by the number of discs 81 inserted. The driving wheel 66 of the control device F rotates in the opposite direction to the arrow in FIG. 5 without producing any effect. The winch C is stopped, then the trolley A is moved back the length of the switching distance. The wheel 66 rotates in the direction of the arrows and at the end of the switching distance produces a control movement whereby the rod 14 is pulled.

During the movement of the trolley the parts of the sequence initiating device adopt the position shown in fine lines in FIG. 10 and also in FIG. 11: the switching pawl 41 lies on the lug 56 of the holding lock 46 and the clamping pawl 40 lies on the rotary lock 47. In FIG. 10 the contact surfaces of the two pawls on the two locks are shown by cross hatching.

The pull exerted on the rod 14 by the control device at the end of the switching path results in rotation of the holding lock 46 in the opposite direction to that of the arrow $u$ as the rod 14 is operatively connected to the holding lock 46. In this way the blockage of the switching pawl 41 is terminated and the switching sleeve 42 rotates by the action of the torsion springs provided inside it. The rocker arm 43 is swung inwardly by means of the cam connection 54 (FIG. 2). During the swinging movement the preliminary clamping stage is initiated as follows: the pawl 41 depresses the cam 55 of the rotary lock 47; the latter rotates in the opposite direction to $w$ (FIG. 10) and the pawl 40 is freed. By means of the clamping springs 48 the tension and compression element 39 fixed to the pawl 40 becomes effective and the two levers 38 rotate about their axis 49 (FIG. 4). At the end of the swinging movement the preliminary clamping action is initiated, the two jaws 37 being pressed onto the cable 4. The main clamping action is brought about by the weights and the forces of the pulling cable acting on the trolley; the rollers 32 run up the valleyside wedge surfaces of the outside of the jaws and thereby ensure that the whole apparatus is securely clamped to the supporting cable 4. The pulling cable 21 has no power. At the same time the rotation of the sleeve 42 has swung the mechanism 15 into the upper position Z shown in FIG. 2; the head 24 of the control rod lies inside the apparatus G on closed holding tongs, thereby fixing the loading hook 22.

The pulling cable 21 is slightly tightened and the tongs in the apparatus G open. While the cable 21 is thereafter slackened the load hook 22 can move out of the apparatus G. When the load has been attached it is raised together with the hook by pulling on the cable 21. At the end of the raising movement the trolley is drawn a short distance uphill by means of compression springs in the apparatus G; from the valley-side jaw wedge 37 on it thus moves onto the mountain-side wedge by the action of the pulling cable 21. During this displacement the jaws 37 remain fixed to the supporting cable 4 by the action of the pre-clamping springs 48.

At the end of the upward movement of the head 24 of the control rod the mechanism 15 is drawn downwards into the position Y in FIG. 2. With the aid of the rocker arm 16 and the joint 17 the rod 15 pulls the switching pawl 41 downwards (rotary direction V) into the position shown in FIG. 11. By the action of springs in the control device the holding lock 46 also swings back into its starting position (rotary direction $u$, FIG. 10). By means of a cam connection the pawl 41 entrains the pawl 40 in the rotary direction V whereupon the rotary lock rotates in the direction $w$ by the action of the spring 57 and locks the pawl 40 (FIG. 12). At the same time the rotation of the pawl 40 with the aid of the flexible tension and compression element 39 makes the two pre-clamping and returning levers 38 of the jaws 37 turn towards one another (direction x, FIG. 2); the lever arm action over the fulcrum 49 stretches both the pre-clamping springs 48 and the restoring springs 50. The slackening of the cable 21 makes the clamping rollers 32 leave the mountain-side cone of the main clamping means on the jaws 37.

The rocker arm 43 and clamping system 31 to 38 turn away from the supporting cable 4 as far as the stops 51 by the action of torsion springs in the sleeve 42.

When the pulling cable 21 is slackened the head 24 of the control rod 23 in the apparatus G again comes to rest on the said holding tongs. The clamping means is swung away from this supporting cable, the load is raised and fixed and the trolley thus ready to travel.

The trolley is now driven into the valley together with the load. The driving wheel 66 of the control device F rotates in the direction of the arrow. As the lever 77 is in the position shown in FIG. 5 with chain lines the rotation of the wheel 66 has no effect.

According to the switching distance of the control device F the trolley is again driven beyond the lowering station, whereupon the direction of movement of the pulling cable 21 is reversed so that the trolley again moves uphill. The wheel 66 rotates in the opposite direction to that of the arrow in FIG. 5 and therefore carries out a further control movement at the end of the switching path. When the pre-clamping means take effect, the member connecting the apparatus G with the rod 15 is turned into the position Z and the lowering and raising of the load hook are repeated as already described. The apparatus functions similarly although the trolley is travelling in the other direction.

*Safety device to prevent the trolley from being lifted unintentionally off the supporting cable*

1 and 2 (FIG. 13) are the side walls of the trolley A, 3 is one of its pulleys and 4 is the fixed supporting cable. The space for the passage of the cable 4 is bounded on three sides by the running surface of the cable pulley 3 and the inner surfaces of the two side walls 1 and 2. On the fourth side, opposite the running surface of the pulley 3, the space is closed by a closure member formed by two pawls 5 and 6 directed towards one another.

The pawls 5 and 6 are made of flat iron of rectangular cross-section and are each pivotally fixed on a bearing block 8 by a bolt 7 (FIG. 14). The bearing blocks are in turn let into excisions in the walls 1 and 2. Owing to the special mounting of the pawls 5 and 6 the latter can be pivoted only upwardly. They are beak-shaped as seen from the side and are so arranged that in their starting position the straight back of both pawls forms a horizontal straight line extending at right angles to the longitudinal axis of the supporting cable. At the side bounded by the curved line the pawls are spherical in section. A torsion spring 9 pressed onto each of the bolts 7 and with one end supported on the bearing block 8 and the other on the back of the pawl holds the pawl in the starting position shown in FIGS. 13 and 14.

The pawls are mounted in the trolley in such a way that they are immediately below the supporting cable and on displacement of the trolley normally adopt the FIG. 13 position. The vertical distance between the lower edge of the supporting cable and the back of the pawls is chosen so that the pawls can carry out the pivoting movement described without touching the cable.

The cable supports mounted at the top of the uprights B are in the form of segmental rails of the same width as the diameter of this supporting cable and tapering at the front and rear ends. When the supports are travelled over their pointed ends move from below against the pawls; as they advance the spherical side of the pawls slides along the support and the increased thickness of the support causes the pawls to be moved upwardly against the force of the springs 9; after leaving the support the pawls return to the starting position shown in FIGS. 13 and 14 in which they prevent the trolley from being accidentally raised and falling from the cable.

*Safety device in the case of the pulling cable being broken*

The safety device J (FIG. 3) comprises the rocker arm 120, the sensing roller 121 and the connecting mechanism 122. The rocker arm 120 is rotatably mounted on a shaft 125 arranged between the two side walls of the trolley on the inlet side of and above the pulling and hoisting cable 21. The connecting mechanism 122 is fixed eccentrically to this end of the rocker arm 120 and transmits the rotary movement of the arm to the holding lock 46. The free end of the arm 120 is shaped as a fork 124 in which the sensing roller 121 is mounted so as to rotate on a spindle 126 fixed in the two ends of the fork. On the shaft 125 is mounted the torsion spring 123, the free end of which is placed in a hole in one side wall of the trolley.

In the position of rest shown in broken lines the rocker arm 120 adopts a position approximately parallel with the pulling cable, determined by the shaft 125 and the pulling and hoisting cable 21 on which the free end of the rocker arm lies by way of the sensing roller 121. The latter is pressed onto the braced cable 21 by the weight of the arm 120 and the force of the torsion spring 123.

If the cable 21 is much overloaded it may break or if it is incorrectly attached to the load hook 22 it may come away from it, leaving the travelling gear to move unobstructed into the valley with the clamping means left open.

If the pulling cable looses its tautness (through breaking or coming undone) then the free end of the rocker arm 120 turns downwardly together with the roller 121, and the fastening point 127 of the connecting mechanism 122 moves in the opposite direction; this movement is transmitted by said mechanism to the holding lock 46, which is turned so as to release the clamping system E and clamp the trolley to the supporting cable 4.

I claim:

1. In a hoisting-and-conveying cableway for loads, the combination with a supporting cable, a trolley mounted on the latter and a power-driven cable winch positioned adjacent said cable, of a single pulling-and-hoisting cable extending from the winch to the trolley and passing through the latter and terminating in a load hook, said trolley being stressed in operation by the load hanging therefrom and by forces applied thereto through said pulling-and-hoisting cable, said pulling-and-hoisting cable benig adapted to move the trolley in both directions along the supporting cable, load-hook holding-and-lowering means pivotally mounted on the trolley, clamping means mounted on the trolley for locking same to the supporting cable at any desired point thereof, said clamping means being adapted to bring about a preliminary clamping stage and a main clamping stage of the trolley on the supporting cable, a mechanical control device mounted on the trolley and adjustable for setting said clamping means to the preliminary clamping stage, the preliminary clamping stage being trippable by said control device and said main clamping stage being brought about by the load and by said forces acting on the trolley, means for moving and holding the clamping means clear of the supporting cable when the trolley is in motion, and a mechanical sequence switch mounted on the trolley and operatively connected to the control device and the load-hook holding-and-lowering means and those parts of the clamping means which bring about the preliminary clamping stage; said switch being adapted to coercively attain an appropriate sequence of the functions necessary for the clamping and unclamping actions.

2. Structure as set forth in claim 1 in which said mechanical switch comprises a switching pawl, a switching sleeve disposed in the trolley and parallel to the supporting cable, said pawl being fixed to said sleeve, a clamping pawl mounted rotatable on said sleeve, and a rotary bolt and a holding bolt which are mounted rotatable in a housing provided on one of the trolley walls.

3. Structure as set forth in claim 2, wherein the switching pawl acts on the clamping pawl via a cam connection, the switching pawl is connected through a linkage to the load-hook holding-and-lowering means, and the clamping pawl is connected by a flexible tension-and-compression element to spring-loaded preclamping and restoring levers of the clamping means.

4. Structure as set forth in claim 3, in which one end of a linkage is eccentrically mounted on the holding bolt, while the other end of the linkage is secured to the control device, said linkage being actuable through the control device, and in which the holding bolt extends below a projecting part of the switching pawl in one position settable by the linkage, whereby said pawl is locked while said bolt in a second position settable by the linkage releases said pawl.

5. Structure according to claim 4, wherein a cam integral with the rotary bolt extends into the path of the projecting part of the switching pawl so that on rotation of said pawl after its release by the holding bolt, the rotary bolt will be turned.

6. Structure as set forth in claim 5, in which the rotary bolt is adapted to block in one position the clamping pawl and to release same on being rotated by the action of the switching pawl.

7. Structure according to claim 6, in which the holding bolt and the rotary bolt are replaced by slide elements.

8. Structure as set forth in claim 6, wherein the clamping means is disposed in an H-shaped rocker arm that is pivotable about the axis of the switching sleeve, the uprights of said arm above the crosspiece thereof and on the inside being formed as guides for the clamping means which forms a structural unit displaceable in said guides.

9. Structure according to claim 8 comprising a traveling gear having more than two rollers, means to cause a displacement of the clamping means in the rocker arm to an extent proportional to the displacement of the supporting cable between the two innermost rollers as caused by the load change on the load hook, in such a way that when the clamping means has been moved adjacent to the supporting cable, the latter is halfway between the two jaws of the clamping means.

10. Structure as set forth in claim 9, in which the vertical adjustment of the supporting cable is transmitted by a flexible connection to a rotary curved element arranged on the rocker-arm crosspiece, and the clamping means through a roller bears on the curve defining said element.

11. Structure according to claim 1, wherein a lever is pivoted to the trolley, of which the free end through a sensing roller bears on the pulling-and-hoisting cable, and of which the other end through a connecting rod secured eccentrically thereto is operatively connected to the holding bolt of the sequence switching apparatus in such a way that upon failure of the pulling cable the clamping process will be initiated.

12. Structure as set forth in claim 11, comprising means to prevent the trolley from being accidentally lifted off the supporting cable, said means including two pawls directed towards each other and held in the closed position by spring force and pivotably mounted below the supporting cable in the two trolley sidewalls, said pawls when running on to a cable support being pivoted towards the supporting cable.

References Cited by the Examiner
UNITED STATES PATENTS

| | | | |
|---|---|---|---|
| 1,069,722 | 8/1913 | Pfouts | 212—110 |
| 1,530,244 | 3/1925 | Dickinson | 212—89 |
| 2,790,561 | 4/1957 | Wyssen | 212—92 |
| 3,058,601 | 10/1962 | Wyssen | 212—92 |
| 3,079,008 | 2/1963 | Naud | 212—96 |

ANDRES H. NIELSEN, *Primary Examiner.*